(12) United States Patent
Zagrodzki et al.

(10) Patent No.: US 7,320,391 B2
(45) Date of Patent: Jan. 22, 2008

(54) ALTERNATIVE PACK DESIGNS FOR MULTIDISK CLUTCHES

(75) Inventors: Przemyslaw Zagrodzki, West Lafayette, IN (US); Wenping Zhao, Crawfordsville, IN (US)

(73) Assignee: Raybestos Products Company, Crawfordsville, IN (US)

( * ) Notice: Subject to any disclaimer, the term of this patent is extended or adjusted under 35 U.S.C. 154(b) by 80 days.

(21) Appl. No.: 10/875,544

(22) Filed: Jun. 24, 2004

(65) Prior Publication Data

US 2005/0284723 A1    Dec. 29, 2005

(51) Int. Cl.
*F16D 13/52*     (2006.01)
*F16D 25/0638*   (2006.01)

(52) U.S. Cl. ............................... 192/70.14; 192/85 AA
(58) Field of Classification Search ............. 192/70.14, 192/87.11, 109 B
See application file for complete search history.

(56) References Cited

U.S. PATENT DOCUMENTS

| | | | |
|---|---|---|---|
| 2,971,612 A | 2/1961 | Graber | |
| 3,094,194 A | 6/1963 | Kershner | |
| 4,741,422 A * | 5/1988 | Fuehrer et al. | 192/87.11 |
| 5,094,331 A | 3/1992 | Fujimoto et al. | |
| 5,234,090 A | 8/1993 | Haka | |
| 5,452,784 A * | 9/1995 | Miyoshi et al. | 192/107 M |
| 5,535,870 A * | 7/1996 | Takezaki et al. | 192/70.14 |
| 5,553,689 A | 9/1996 | Chareire | |
| 5,735,376 A | 4/1998 | Moroto et al. | |
| 5,765,673 A | 6/1998 | Nishiyama et al. | |
| 5,829,566 A * | 11/1998 | Winks et al. | 192/70.12 |
| 5,913,395 A | 6/1999 | Takakura et al. | |
| 5,931,275 A | 8/1999 | Kasuya et al. | |
| 5,975,267 A | 11/1999 | Takakura et al. | |
| 6,237,727 B1 * | 5/2001 | Tatewaki et al. | 188/71.6 |
| 6,382,382 B1 * | 5/2002 | Avny et al. | 192/106 F |
| 6,484,853 B1 | 11/2002 | Zagrodzki | |

* cited by examiner

*Primary Examiner*—Richard M Lorence
(74) *Attorney, Agent, or Firm*—Brooks Kushman P.C.

(57) ABSTRACT

A method and apparatus reduces hot spotting in transmission clutch packs actuated by a piston with axial fingers engaging the clutch pack. The method and apparatus combine an alternative pack arrangement with the fingered actuator, the alternative pack preferably being an inverted double sided pack or a single sided pack. The friction plates may have single or double side friction layers, but a second set of plates are splined for rotation with the shaft when the friction plates and the piston are splined for rotation with the housing in which the shaft rotates.

20 Claims, 4 Drawing Sheets

ALTERNATIVE PACK DESIGNS FOR MULTIDISK CLUTCHES

BACKGROUND OF THE INVENTION

1. Field of the Invention

The invention relates to a transmission clutch that combines an alternative clutch pack design with a fingered piston actuator aligned with the clutch plates to reduce hot spotting problems peculiar to clutch designs using fingered piston actuators.

2. Background Art

In general, heat degrades a clutch's performance and accelerates the wear of friction materials and metal plates. Clutches with so-called finger pistons, which are fairly common in automotive transmissions, are particularly problematic.

A common type of multidisk clutch is shown in FIG. 1. The clutch includes a set of friction disks (three in the example shown) and a set of so-called reaction plates (two in the example shown). Each friction disk has a steel core with two layers of friction material secured to the two sides of it. Friction disks have splines or teeth at the inner perimeter, as shown in the figure, which mesh with an internal shaft or hub in a well known manner. Friction disks are axially moveable but rotationally fixed relative to the hub or shaft. In other words, each friction disk rotates together with the shaft or hub.

Reaction plates are disks usually made of steel or less usual, of cast iron. They have splines or teeth at the outer perimeter and mesh with a drum or a housing. Reaction plates are axially moveable but rotationally fixed to the drum or housing. Similarly, the piston and the apply plate, which bring the friction clutch into engagement by exerting axial force that compresses the pack of disks, are axially moveable and fixed to the drum or housing against relative rotation. The end plate is most typically axially fixed (although it may also be moveable) and fixed against relative rotation to the drum. The reaction plates, the piston, the apply plate, and the end plate rotate together with the drum (housing), while the friction disks rotate together with the shaft (hub).

In the example shown in FIG. 1, there are six sliding interfaces. Each sliding interface is created by a pair of surfaces which rotate relative to each other. More precisely, the sliding interface is defined by the surface of a part rotating with the shaft and the surface of a part rotating with the drum. In some clutches, the drum or housing is stationary, and this apparatus may be called a brake. However, both the shaft (hub) and drum (housing) are often rotating parts. If the clutch is disengaged, they rotate at different speeds. When the piston moves axially to engage the clutch, all the pairs of surfaces are brought into frictional contact. As a result, a frictional torque is generated which tends to slow down the parts rotating at higher speed and accelerate the parts rotating at lower speed. This process ends when the two speeds become equal and then the whole clutch rotates as a rigid body, without relative rotation of the shaft (hub) and the drum (housing). In the case of brake (a clutch with stationary housing), the engagement process is analogous and the shaft (hub) rotating at the beginning of the process is brought to stop as a result of engagement.

Arrangements of the pack other than that shown in FIG. 1 are possible. Each of the sliding interfaces is usually created by the pair of a friction material layer against a metal surface. Non-sliding interfaces, if there are such interfaces in the clutch, can be created by similar materials, e.g. steel against steel. The clutch shown in FIG. 1 does not have a non-sliding interface. FIG. 2 shows another common clutch design which has an additional reaction plate placed between the piston and the left outermost friction plate. The piston and the reaction plate next to it have outer splines (teeth) so that both mesh with the drum (housing), and therefore the interface between them is a non-sliding interface. Consequently, metal against metal contact is acceptable there.

Another double-sided clutch design, an inverted double-sided design, has been known for years in automotive and heavy machinery applications, which do not employ finger pistons. In that design, friction disks have splines at the outer perimeter and therefore mesh with the drum (housing). Consequently, the steel reaction plates have to be equipped with splines or teeth at the inner perimeter to mesh with the shaft (hub). The interface between the piston and the adjacent friction disk is a non-sliding interface. Similarly, the interface between the end plate and the adjacent friction disk is a non-sliding interface. As used in this description, double sided clutch pack refers to a clutch pack with at least one double-sided friction plate with a friction layer on both sides, regardless whether any single sided plates are included in the clutch pack.

The durability or period of warranty coverage may be limited as has been noted in some common double-sided friction plate clutches used in today's automotive transmissions, where the finger piston is used as shown in FIGS. 1 and 2. The finger piston is most typically employed when the hydraulic piston engaging the clutch is distant from the clutch pack. When the apply force is transmitted from the distant piston to the apply plate of the clutch by means of several axial "fingers", an example of such a piston is shown in FIG. 3, the consequence of this design is that the axial force transmitted by the fingers is applied to the pack non-uniformly around the circumference. By contrast, in the designs with the piston having a circumferentially continuous side surface and acting directly on an apply plate, the force is applied uniformly around the circumference by the annular surface.

SUMMARY OF THE INVENTION

The present invention overcomes the above-mentioned disadvantages by providing a method and an arrangement that reduces hot spotting in transmission clutches employing fingered piston actuators. Advanced thermomechanical models of friction clutches have been developed to identify the phenomena of thermo-elastic instability hot spotting induced in that design, and facilitated development of alternative pack designs that offer substantial improvements. The preferred embodiments include fingered piston actuators used in conjunction with an "inverted" pack, which provides a dramatic improvement, and with a single-sided pack, which also provides very substantial improvement. As used in the disclosure, the term inverted pack refers to arrangements in which reaction disks rotate relative to the friction plates and the piston actuator. The term alternative pack relates either to inverted pack or to single-sided pack designs.

One embodiment of this invention uses an inverted double-sided pack design, whereby the friction disks having splines or teeth on their outer perimeter are thereby rotatably fixed to the drum (housing), the piston and the end plate as shown in FIGS. 5 and 6. The metal reaction plates, having splines or teeth at their inner perimeter, are thereby rotatably fixed to the hub (shaft). The finger piston slides axially while rotating with the housing (drum) as in previously known clutches, but the combination of the fingered piston and the alternative clutch pack arrangement prevents hot spotting which is caused by that piston design.

A preferred embodiment example shown in FIG. 7 includes a design where the linings of friction material are directly secured to the piston or apply plate and to the end plate. This design offers a shorter total pack length than other embodiments taught in the application at the cost of a more complicated manufacturing process in which friction linings have to be bonded to the apply plate and the end plate. A combination of pack designs shown in FIGS. 5, 6 and 7, is also possible. For example, a single-sided friction disk may be used on one end of the pack, while on the other end the friction material lining may be bonded to the apply plate or to the end plate.

The advantages of the combination of using the alternative clutch pack design with the finger piston actuator as a countermeasure to the hot spotting problem were based on developments practiced by computer simulations and also verified experimentally by building and testing.

In another embodiment, the combination includes a single-sided pack design as shown in FIG. 8. This pack design also eliminates or substantially reduces the problems with hot spotting generated by the finger piston.

The invention also includes a method for reducing hot spotting that causes problems and for improving working life by resolving hot spotting in clutches with fingered piston actuators aligned with the plates.

BRIEF DESCRIPTION OF THE DRAWINGS

The present invention will be more clearly understood by reference to the following detailed description of the preferred embodiment when read in conjunction with the accompanying drawing in which like reference characters refer to like parts throughout the views and in which.

DETAILED DESCRIPTION OF THE PREFERRED EMBODIMENT(S)

Three major phases in the clutch operation can be identified as a) disengaged: the piston is retracted so that there is a clearance between each pair of surfaces and the clutch does not transmit torque; shaft and drum rotate at different speeds; b) sliding phase or transient engagement phase: the piston applies force to the pack so that the frictional torque is produced; speeds of the shaft and the drum are different; a substantial part of the power delivered to the clutch is transferred into heat due to frictional processes while the rest is transmitted by the clutch; and c) engaged: the piston applies force and frictional torque is produced; the speeds of the shaft and the drum are equal, so that there is no sliding and no power is transferred into heat in the clutch; the power is very effectively transmitted by the clutch.

Phase b), which is sliding phase, is very short in duration compared to phases a) and c). It usually lasts less than one second, sometimes a small fraction of a second. Phases a) and c) last for seconds, minutes or tens of minutes. The sliding phase is thus a short episode in terms of duration. However, it is the most critical phase in terms of thermal and mechanical loads. Very high amount of heat is generated during this phase resulting in high temperatures and high thermal stresses in pack components. Excessive temperatures and thermal stresses contribute to premature wear of friction material. Moreover, they often cause catastrophic failures of friction elements such as permanent distortions. Therefore, phase b) (displacement) determines the strength and durability of the clutch.

Figure 1:
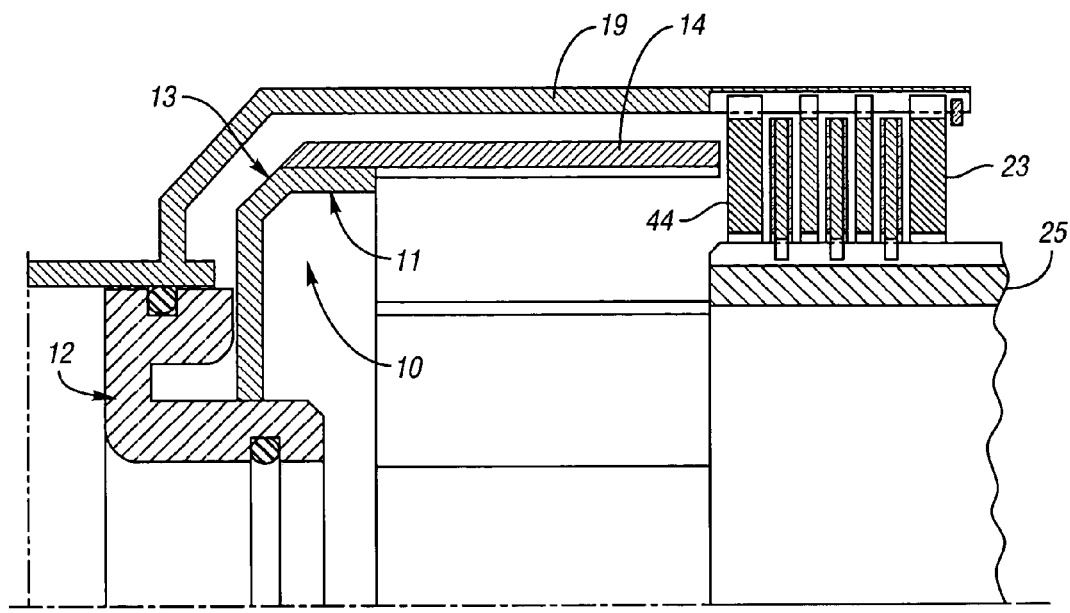
FIG. 1 is an enlarged sectional view of an above centerline portion conventional double-sided clutch with parts removed for clarity in presenting the problem resolved by the present invention.
Figure 2:
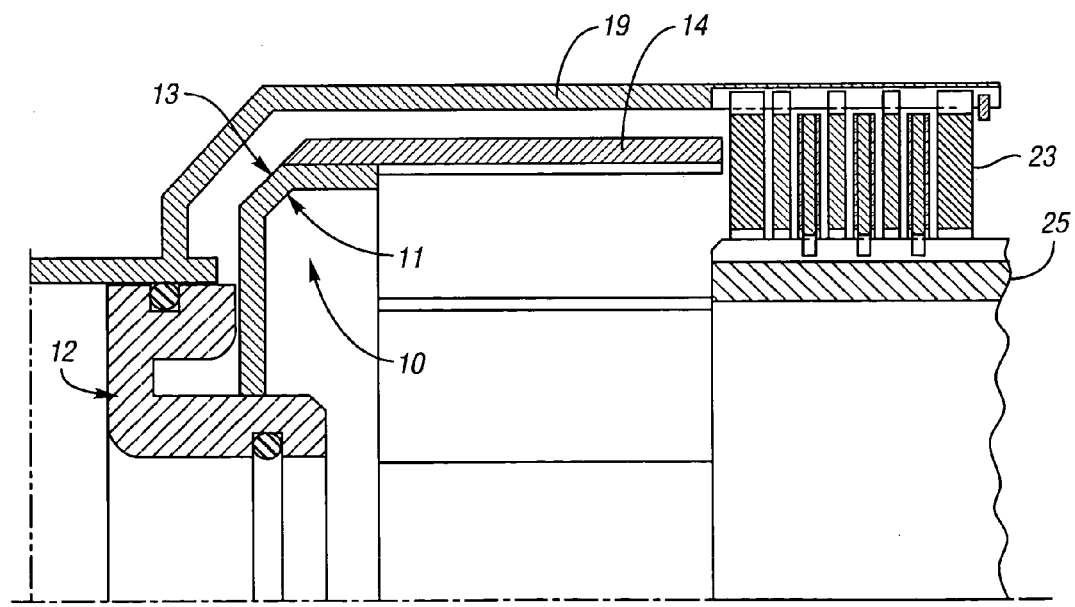
FIG. 2 is an enlarged sectional view similar to FIG. 1 but showing another common double-sided clutch exhibiting the problem addressed by the present invention.
Figure 3:
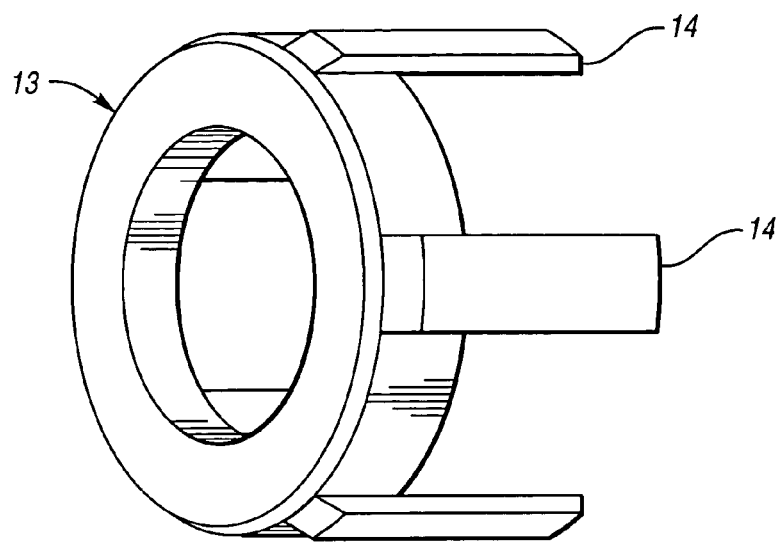
FIG. 3 is an enlarged perspective view of a piston ring with fingers as shown in FIGS. 1 and 2.
Figure 4:
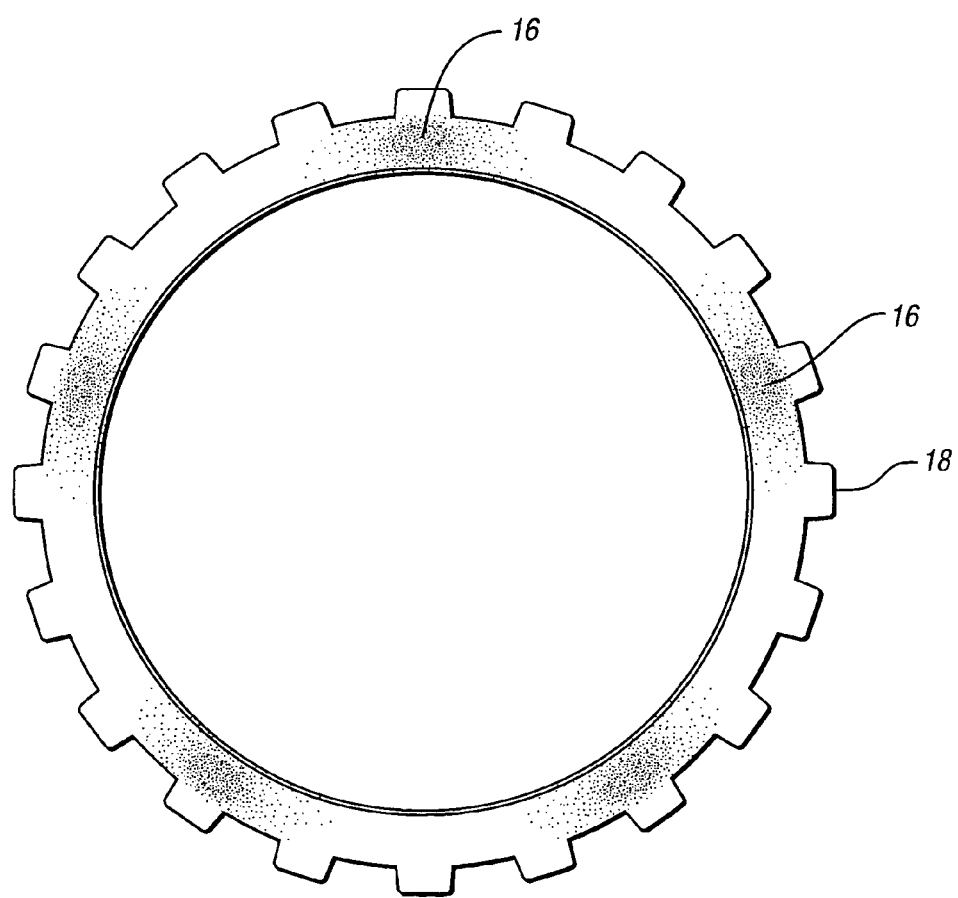
FIG. 4 is an elevational view of a plate with shading schematically illustrating hot spots on a metal sliding surface caused by finger piston engagement in the double-sided clutch design of FIGS. 1 and 2.

An actuator 10 may be a fingered actuator 11. In the preferred embodiment, the fingered actuator 11 is composed of an hydraulic piston 12 and a piston ring 13 with the fingers 14 as shown in FIG. 1. The actuator 10 can also be made as a single part or can be composed of multiple parts. The fingered piston actuator is distinguished by axially elongated fingers 14 which transmit an axial force generated by hydraulic pressure against the piston to compress the pack of disks. The fingers 14 exert the force on left outermost component of the pack, which can be either apply plate 44, or other pack element, such as a reaction plate or a friction disk. In the example shown in FIGS. 3, the piston ring 13 has five fingers 14. However, the number of fingers can be different and is usually between three and eight. All the fingers 14 in the fingered actuator 11 may be identical or may have different shapes. Also, the fingers 14 can either be equidistant along circumference or irregularly located. The right outermost component of the pack shown in FIG. 1 is the end plate (backing plate) 23. The fingered piston is now understood to induce a force in the clutch plates with the fingers 14, which is non-uniformly distributed around the circumference along the annular face. In the conventional transmission clutch pack, the plate 18 (FIG. 4) is a reaction plate externally splined for interconnection to and rotation with the housing 19 and the piston 12 (FIG. 1). In the conventional clutch pack the engagement may produce excessively heated areas, diagrammatically illustrated as shaded areas 16 on plates 18 as shown in FIG. 4, commonly known as "hot spots." Hot spots usually leave visible local dark discoloration on the sliding surfaces of reaction plates caused by high local temperature. The shaded areas observed illustrate the problem caused by non-uniformly distributed force. Hot spots on the sliding interfaces lead to premature wear or failure of friction material and other components. Recent experimental tests confirm that, as shown in FIG. 4, hot spots are generated on the surfaces of steel reaction plates 18 in the course of clutch operation.

The fingered actuator used in some transmissions on the market may cause reduced life and performance that may now be attributed to the fact that hot spots are caused by that piston type and may be a major cause of the failures of the transmissions. Therefore, a countermeasure to the hot spotting problems driven by the finger piston addresses the problems that have not been previously resolved but were known as practical problems.

As an actuator 10 is used to exert axial force on a clutch pack and thereby engage the clutch in a well known manner, the preferred embodiments compensate for the hot spotting in some automotive transmissions, in which the hydraulic chamber of the piston 12 is distant from the pack, often because there is another clutch incorporated between them, the axial push rods or fingers 14 are used to transfer the force from the piston to the clutch's apply plate. Other designs, for example, those in which the piston has an annular shape and acts either directly on the pack or through an apply plate, do not suffer from the same degree of hot spotting as the designs that include fingered pistons.

Figure 5:
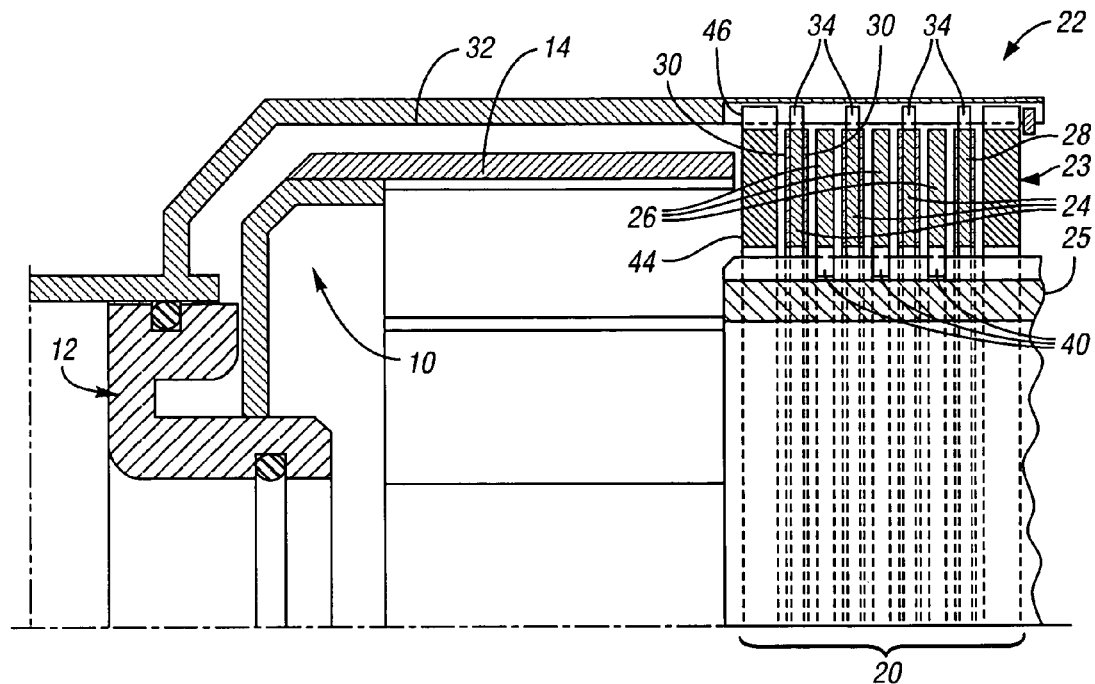
FIG. 5 is an enlarged sectional view of an alternative double-sided clutch disk pack in combination with a fingered actuator according to the present invention.

Referring now to FIG. 5, a clutch pack 20 of a transmission 22 has so-called double-sided friction disks 24 sliding against steel reaction plates 26. A double-sided friction disk 24 is a disk composed of a metal core 28 with friction material layer 30 secured to both sides of the core 28. Contrary to typical, the friction disks 24 are not mounted on an internal shaft or hub 25. They are axially moveable relative to the housing 32 and are connected to the housing by splines 34, although lugs or other connectors can be used. Thus, unlike the friction disks with internal splines/lugs, the disks 24 have outer spline teeth 34. The reaction plates 26, interleaved with the friction disks 24, have internal splines 40 which mesh with clutch shaft or hub 25. The drum 32 is rotationally connected to the apply plate 44 by spline connection 46, and thereby to the actuator 10, so that both parts rotate together.

From this description, the arrangement is inverted from the conventional design in which all the reaction plates rotate together with the piston 12 (in other words they are stationary relative to the piston), while all friction disks rotate with the shaft/hub. Rather, in an "inverted" clutch pack, the friction disks 24 are rotating together with the drum 32 (housing) and thereby with the actuator components 12 and 14, and the reaction plates 26 rotating together with the shaft/hub 25.

Figure 8:
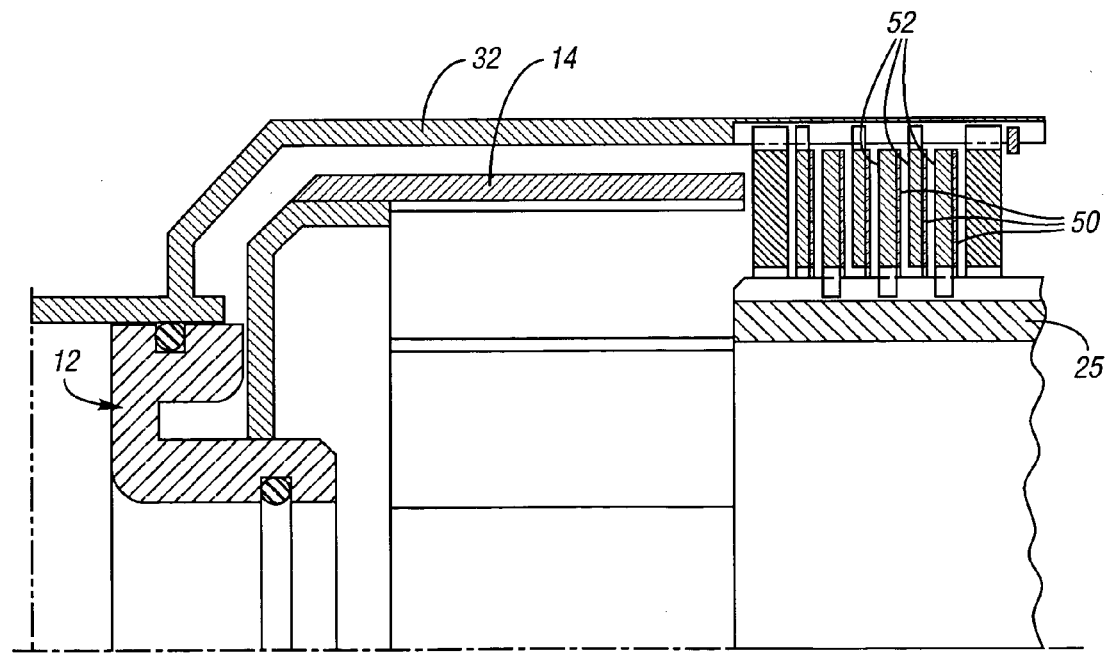
FIG. 8 is an enlarged sectional view of still another alternative clutch design, which incorporates a single-sided disk clutch pack in combination with a fingered actuator according to the present invention.

Unlike in the double-sided packs (either conventional or inverted), a disk in a single-sided pack shown in FIG. 8 is composed of a steel core with a single layer of friction material secured to one side of it. The friction material layer 50 of each disk faces in the same direction so that it mates with the steel surface of the adjacent disk in the pack. Single-sided disks with internal splines or lugs at the annual ring's inner circumference mesh with those of a shaft or hub. These disks are interleaved with single-sided disks having external splines or lugs, which mesh with those of a drum or a housing 32. As shown in FIG. 8, single-sided disks may face in either direction so long as contact is made between a friction layer 50 and a core surface 52.

The fingered actuator 11 transmits axial force to the pack 20 through the fingers 14. The fingers 14 may be installed to exert force on the apply plate. The force is applied only in the areas where the fingers contact the plate. As a consequence, some pressure variation around the pack circumference on the sliding interfaces is produced. Since the frictional heat generated during the clutch engagement is proportional to the local contact pressure, this pressure variation leads to non-uniform heat generation around the pack circumference. At the locations 16 (FIG. 4) where the pressure is higher, a larger amount of heat is generated. Consequently, the reaction plates experience higher temperature rise at those locations. In the conventional double-sided clutch pack, the reaction plates are stationary relative to the fingers, and therefore the same locations 16 are exposed to higher frictional heating during the whole engagement so that the heat tends to accumulate at those locations. In addition, thermal expansion at those locations causes additional pressure increase at the locations and therefore, higher temperature. As the pressure tends to grow during the engagement at the locations where it was originally higher, the differential pressure increases and the differential temperature increases around the plates. This creation of hot spots, which ultimately leads to strong concentration of contact pressure in a few areas, is reduced when friction layered plates are aligned for rotation with the fingers. The inventors recognized this phenomena as thermo-elastic instability (TEI) in transmission clutches and brakes, a phenomenon previously studied in other frictional systems.

Figure 6:
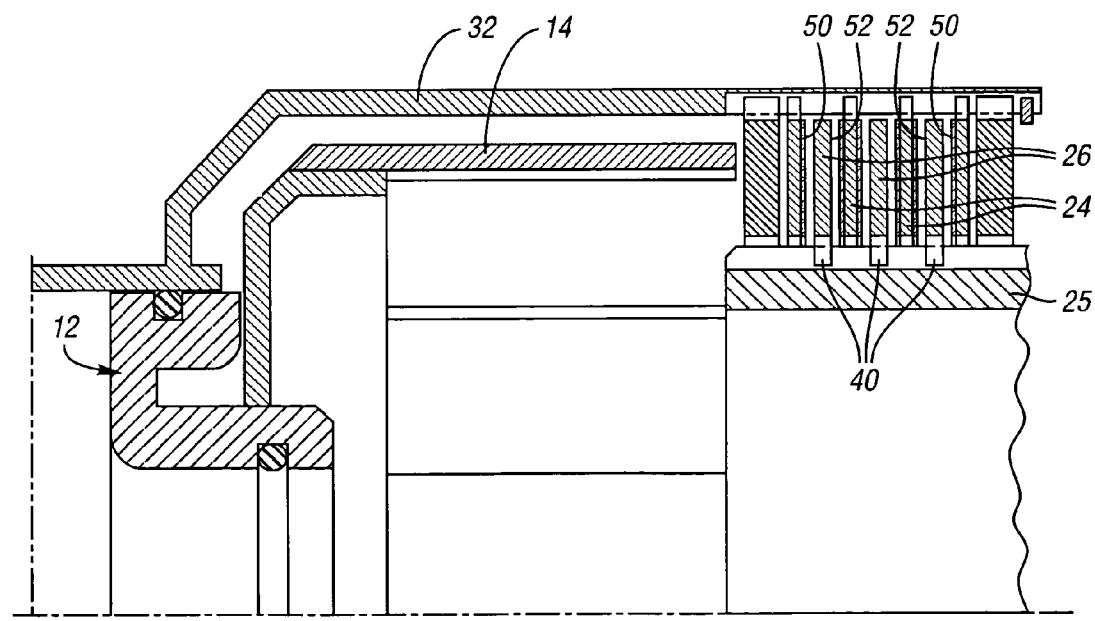
FIG. 6 is an enlarged sectional view of another example of an alternative, double-sided disk clutch pack in combination with a fingered actuator according to the present invention.
Figure 7:
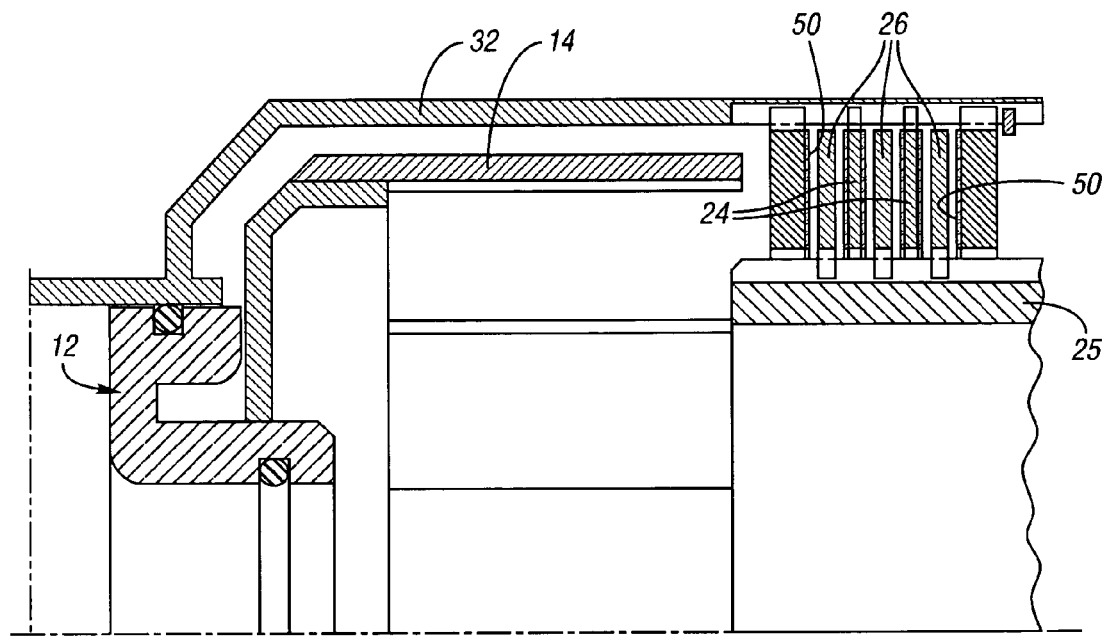
FIG. 7 is an enlarged sectional view of another example of an alternative, double-sided disk clutch pack in combination with a fingered actuator according to the present invention.

The clutch packs of the preferred embodiments, according to the present invention, shown in FIGS. 5-7, have the reaction plates 26 rotating relative to the fingers 14. Consequently, the areas 16 (FIG. 4) with higher pressure, which is produced by the finger piston 12 and 14 (FIGS. 5-7), move constantly relative to the reaction plates 26 and the heat is distributed around the circumference of the reaction plate rather than accumulated at fixed locations. In this way, the mechanism causing an increase of the pressure variation due to the thermal expansion is substantially reduced.

In the preferred embodiments shown in FIGS. 5, 6, and 7, the friction disks 24 are stationary relative to the piston fingers 14. However, the friction disks 24, unlike the steel reaction plates 26, are not prone to create hot spots. Two factors contribute to that behavior of the friction disks 24. One is a low modulus of elasticity of the friction material, roughly three orders of magnitude lower than that of steel. The contact pressure variation caused by thermal expansion is proportional to the modulus of elasticity of the expanding material. Hence, thermal expansion of the friction material in the friction lining causes only minor changes in the contact pressure. The other factor is low thermal conductivity of the friction material. Only a thin layer of the friction material is penetrated by the heat during short-lasting clutch engagement, and therefore only small volume of that material experiences noticeable thermal expansion.

The FIG. 8 single-sided clutch design provides substantial improvement (compared to the conventional double-sided clutch) in the mitigation of hot spots that are triggered by the finger piston 12. In a single-sided clutch pack, some of the steel cores rotate relative to the fingers while the others are stationary. Hence, in terms of the thermomechanical effects described above, this embodiment substantially reduces hot spotting encountered in conventional double-sided packs, but not as well as the inverted double-sided clutch pack.

In summary, the invention comprises an innovative application of pack designs such as the "inverted" double-sided multidisk pack, and the single-sided pack, and other combinations of those disk types within a pack, in a clutch with a so-called finger piston actuator. Clutches with that type of piston may be made less susceptible to failure induced by hot spotting compared to a conventional double-sided pack design. While hot spotting may be linked to noise, vibration and harshness (NVH) problems in dry disk brakes, there is no consensus that such problems would be characteristic in wet clutches. However, hot spotting in wet clutches, such as automotive transmission clutches, can cause performance problems and catastrophic wear as friction material may glaze and decrease friction coefficient and the friction layer may be removed from the steel core.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A transmission clutch including a rotating hub mounted for rotation relative to a rotating clutch housing in the transmission; the clutch comprising:
    an alternative clutch pack having a plurality of annular plates including a first set of plates interleaved with a second set of friction plates having at least one layer of friction material on at least one side of each said friction plate, and
    a clutch pack actuator including a plurality of axially elongated fingers aligned with said plates;
    wherein said first set of plates is secured for rotation with the hub, wherein said second set is rotatably fixed to the rotating clutch housing and said actuator is axially displaceable but rotatably restrained relative to the rotating clutch housing.

2. The invention as defined in claim 1 wherein said second set of friction plates includes at least one plate having a friction layer applied to both sides of the plate, and each said side facing a bare surface of an adjacent plate.

3. The invention as defined in claim 2 wherein each said friction plate has a friction layer on both sides of the plate, and said first set of plates are reaction plates.

4. The invention as defined in claim 1 wherein each said friction plate has a single side carrying a friction lining.

5. The invention as defined in claim 1 wherein said clutch includes at least one of an end plate and an apply plate secured for rotation with said rotating clutch housing.

6. The invention as defined in claim 5 wherein said at least one of an end plate and an apply plate faces an unlined surface of said friction plate.

7. The invention as defined in claim 5 wherein said at least one of an end plate and an apply plate includes a friction lining.

8. The invention as defined in claim 7 wherein said one plate faces a reaction plate secured for rotation with said hub.

9. The invention as defined in claim 1 wherein said first set of plates includes at least one reaction plate.

10. The invention as defined in claim 1 wherein said first set and said second set are single-sided friction plates.

11. A method for reducing thermo-elastic instability hot spotting in a transmission clutch including a clutch pack of a plurality interleaved plates with annular surfaces engageable by axial displacement of an actuator having axially extended fingers in alignment with said annular surfaces in a transmission having a hub rotating relative to a rotating clutch housing, the method comprising:
    including a friction plate with at least one layer of friction material on at least one side to form a first set of friction plates;
    securing said first set of said friction plates to the clutch housing for rotation with said rotating clutch housing; and
    securing a second set of said plurality of plates to a hub for rotation with said hub, each plate of said second set having at least one unlined plate surface in alignment with said fingers and subjected to circumferentially non-uniform axial forces generating frictional torque.

12. The invention as defined in claim 11 wherein said including step comprises including at least one plate with at least one friction layer on each of two sides.

13. The invention as defined in claim 11 wherein said including step comprises including at least one single-sided plate.

14. The invention as defined in claim 13 wherein said including step comprises facing a lined surface of each said single-sided plate in a single direction.

15. The invention as defined in claim 14 wherein said facing comprises positioning said lined surface adjacent to a reaction plate.

16. The invention as defined in claim 11 and further comprising positioning at least one of an end plate and an apply plate.

17. The invention as defined in claim 16 and including a friction lining on said at least one of said end plate and said apply plate.

18. The invention as defined in claim 17 and further comprising locating one of said plates of said second set adjacent to said at least one of an end plate and an apply plate.

19. A transmission clutch including a rotating hub mounted for rotation relative to a rotating clutch housing of the transmission; the clutch comprising:
    an alternative clutch pack having a plurality of annular plates including a first set of plates interleaved with a second set of friction plates having at least one layer of friction material on at least one side of each said friction plate, and
    a clutch pack actuator including a plurality of axially elongated fingers aligned with said plates;
    wherein said first set of plates is secured for rotation with the hub, wherein said second set is rotatably fixed to the rotating clutch housing of the transmission and said actuator is axially displaceable but rotatably restrained relative to the rotating clutch housing,
    wherein said clutch includes at least one of an end plate and an apply plate secured for rotation with said rotating clutch housing, and
    wherein said at least one of an end plate and an apply plate faces a friction lining on an adjacent said friction plate.

20. A transmission clutch including a rotating hub mounted for rotation relative to a rotating clutch housing operating above 1000 rpm and further including a fingered piston aligned for circumferentially non-uniform, engagement of aligned clutch plates in the transmission, the clutch comprising:
    an alternative clutch pack having a plurality of annular plates including a first set of plates interleaved with a second set of friction plates having at least one layer of friction material on at least one side of each said friction plate, and
    a clutch pack actuator including a plurality of axially elongated fingers aligned with said plates;
    wherein said first set of plates is secured for rotation with the hub, wherein said second set is rotatably fixed to the rotating clutch housing and said actuator is axially displaceable but rotatably restrained relative to the rotating clutch housing.

* * * * *